US008084970B2

(12) United States Patent
Mullin et al.

(10) Patent No.: US 8,084,970 B2
(45) Date of Patent: Dec. 27, 2011

(54) ELECTRICAL MACHINE AND METHOD OF CONTROLLING THE SAME

(75) Inventors: Paul Steven Mullin, Yellow Springs, OH (US); Brian Thomas Branecky, Oconomowoc, WI (US)

(73) Assignee: Regal Beloit EPC Inc., Beloit, WI (US)

( * ) Notice: Subject to any disclaimer, the term of this patent is extended or adjusted under 35 U.S.C. 154(b) by 287 days.

(21) Appl. No.: 12/398,675

(22) Filed: Mar. 5, 2009

(65) Prior Publication Data

US 2009/0160384 A1     Jun. 25, 2009

Related U.S. Application Data

(60) Division of application No. 11/379,607, filed on Apr. 21, 2006, now Pat. No. 7,514,887, which is a continuation-in-part of application No. PCT/US2004/034938, filed on Oct. 22, 2004.

(60) Provisional application No. 60/734,855, filed on Nov. 9, 2005, provisional application No. 60/514,366, filed on Oct. 24, 2003.

(51) Int. Cl.
    *H02P 6/04* (2006.01)

(52) U.S. Cl. ......... 318/400.11; 318/400.09; 318/400.32; 318/400.34; 318/362; 318/366; 388/928.1; 388/925

(58) Field of Classification Search ............. 318/400.11, 318/400.09, 400.32, 400.24, 362, 366; 388/928.1; 388/925
    See application file for complete search history.

(56) References Cited

U.S. PATENT DOCUMENTS

| 3,636,429 A | 1/1972 | Jakubowski et al. |
| 3,663,880 A | 5/1972 | Gabor |
| 4,286,202 A | 8/1981 | Clancy et al. |
| 4,673,849 A | 6/1987 | Sears et al. |
| 4,896,089 A | 1/1990 | Kliman et al. |
| 5,001,405 A | 3/1991 | Cassat |
| 5,003,241 A | 3/1991 | Rowan et al. |
| 5,012,166 A | 4/1991 | Ushijima et al. |

(Continued)

FOREIGN PATENT DOCUMENTS

WO     2005/043713     5/2005

OTHER PUBLICATIONS

United States Patent Office Action for U.S. Appl. No. 11/379,607 dated May 13, 2008 (31 pages).

(Continued)

*Primary Examiner* — Bentsu Ro
*Assistant Examiner* — Erick Glass
(74) *Attorney, Agent, or Firm* — Michael Best & Friedrich LLP (57) ABSTRACT

An electrical machine having a stator and a rotor. The stator includes a core and a plurality of windings disposed on the core in a multiple-phase arrangement. The rotor is disposed adjacent to the stator to interact with the stator. A method of operating the motor includes applying a pulsed voltage differential to first and second terminals of the windings resulting in movement of the rotor; monitoring the back electromotive force (BEMF) of the windings to sense rotor movement; after the applying and monitoring steps, monitoring the BEMF of the windings to determine whether the rotor is rotating in a desired direction, and electrically commutating the motor when the rotor is rotating in the desired direction and zero or more other conditions exist.

18 Claims, 9 Drawing Sheets

U.S. PATENT DOCUMENTS

| | | | |
|---|---|---|---|
| 5,198,733 A | 3/1993 | Wright |
| 5,223,771 A | 6/1993 | Chari |
| 5,235,264 A | 8/1993 | Kaneda et al. |
| 5,298,838 A | 3/1994 | Peters et al. |
| 5,343,127 A | 8/1994 | Maiocchi |
| 5,350,984 A | 9/1994 | Carobolante et al. |
| 5,397,972 A | 3/1995 | Maiocchi |
| 5,466,999 A | 11/1995 | Hutsell |
| 5,537,020 A | 7/1996 | Couture et al. |
| 5,572,097 A | 11/1996 | Cameron |
| 5,623,379 A | 4/1997 | Nishimura et al. |
| 5,796,227 A | 8/1998 | Sears et al. |
| 5,847,535 A | 12/1998 | Nordquist et al. |
| 5,986,419 A | 11/1999 | Archer et al. |
| 5,998,946 A | 12/1999 | Kim |
| 6,034,493 A | 3/2000 | Boyd et al. |
| 6,091,222 A | 7/2000 | Vertemara et al. |
| 6,100,656 A | 8/2000 | El-Sadi et al. |
| 6,107,772 A | 8/2000 | Liu et al. |
| 6,160,367 A | 12/2000 | Higashi et al. |
| 6,229,274 B1 | 5/2001 | Vertemara et al. |
| 6,249,096 B1 | 6/2001 | Shin |
| 6,249,101 B1 | 6/2001 | Viti et al. |
| 6,326,752 B1 | 12/2001 | Jensen et al. |
| 6,342,770 B1 | 1/2002 | Stephan et al. |
| 6,483,266 B2 | 11/2002 | Miyazaki et al. |
| 6,534,938 B1 | 3/2003 | Wu et al. |
| 6,538,403 B2 | 3/2003 | Gorti et al. |
| 6,541,928 B2 | 4/2003 | Eroglu et al. |
| 6,563,286 B2 | 5/2003 | Seki et al. |
| 6,566,830 B2 | 5/2003 | Walters et al. |
| 6,570,351 B2 | 5/2003 | Miyazaki et al. |
| 6,570,353 B2 | 5/2003 | Krotsch et al. |
| 6,639,371 B2 | 10/2003 | Walters et al. |
| 6,653,811 B2 | 11/2003 | Branecky |
| 6,741,046 B1 | 5/2004 | Krauth et al. |
| 6,774,590 B2 | 8/2004 | Inagawa et al. |
| 6,803,737 B2 | 10/2004 | Scheidegger et al. |
| 6,850,022 B2 | 2/2005 | Liu et al. |
| 6,900,604 B2 | 5/2005 | Kokami et al. |
| 6,995,530 B2 | 2/2006 | Biamonte et al. |
| 7,088,064 B2 | 8/2006 | Brakelmann et al. |
| 7,095,204 B2 | 8/2006 | Lee et al. |
| 7,242,175 B2 | 7/2007 | Shao et al. |
| 7,514,887 B2 | 4/2009 | Mullin et al. |
| 2001/0030517 A1 | 10/2001 | Batzel |
| 2002/0033688 A1 | 3/2002 | Viti |
| 2002/0043954 A1 | 4/2002 | Hallidy |
| 2002/0050800 A1 | 5/2002 | Miyazaki et al. |
| 2003/0062860 A1 | 4/2003 | Wu et al. |
| 2003/0231875 A1 * | 12/2003 | Masino .................. 388/928.1 |
| 2005/0156545 A1 | 7/2005 | Mueller et al. |
| 2006/0284581 A1 | 12/2006 | Mullin et al. |

OTHER PUBLICATIONS

United States Patent Office Action for U.S. Appl. No. 11/379,607 dated Dec. 2, 2008 (6 pages).

Mexican Office Action for Application No. PA/A/2006/004530 dated Apr. 28, 2009 (3 pages).

International Search Report for Application No. PCT/US2004/034938 dated Mar. 31, 2006 (1 page).

Written Opinion for Application No. PCT/US2004/034938 dated Mar. 31, 2006 (3 pages).

Mexican Patent Office Action for Application No. PA/A/2006/004530 dated Sep. 30, 2009 (2 pages).

Fairchild Semiconductor Corporation, Application Brief 42020, The SmartStart™ Technique for BLDC Motors, Sep. 1996, Revised Oct. 25, 2000.

Mexican Office Action for Application No. PA/A/2006/004530 dated Apr. 27, 2010 (4 pages).

* cited by examiner

Pulse [0]:
A on, B dc, C off

Pulse [1]:
A dc, B off, C on

Pulse [2]:
A off, B on, C dc

ELECTRICAL MACHINE AND METHOD OF CONTROLLING THE SAME

RELATED APPLICATIONS

This application is a divisional of U.S. patent application Ser. No. 11/379,607, filed Apr. 21, 2006; which claims the benefit of U.S. Provisional Patent Application No. 60/734,855, filed Nov. 9, 2005, and which is a continuation-in-part of International Application No. PCT/US2004/034938, filed Oct. 22, 2004, which claims the benefit of U.S. Provisional Patent Application No. 60/514,366, filed Oct. 24, 2003.

FIELD OF INVENTION

The invention relates to an electrical machine and specifically a brushless electrical machine.

BACKGROUND AND SUMMARY OF THE INVENTION

Brushless direct current (BLDC) motors are becoming more prevalent in industries that typically did not use BLDC motors. For example, the need for increased efficiency in the heating and air conditioning market has led to the use of BLDC motors for powering the blower. BLDC motors include a rotor having a plurality of magnetic poles (e.g., a plurality of poles produced with permanent magnets) of alternating polarity disposed on a surface of a rotor core, and a stator that receives electrical power and produces a magnetic field in response thereto. The magnetic field of the stator interacts with a magnetic field of the rotor to cause movement of the rotor.

BLDC motors require a means for determining the position of the rotor in order to commutate the motor. One method of commutating the motor is referred to as "sensorless" motor commutation. Sensorless motor commutation is often performed by sensing the back electromotive force (BEMF) produced by the motor. Typically, the BEMF signal produced in the stator windings is not large enough for sensorless motor commutation until the speed of the rotor reaches about ten percent of the rated motor speed. As a result, a means of starting the motor without using the BEMF signal may be necessary.

For a three-phase motor, one method of starting the motor is to align the rotor by providing current to one phase of the motor and wait until the rotor has stopped oscillating, then step through the other phases of the motor (with each subsequent phase getting shorter, thus ramping the speed up without any position feedback) until the rotor reaches 10% of rated speed. This method traditionally has two drawbacks. First, the time required during the align phase can be long where the inertia of the attached load is large and the friction is low (e.g., if the load is a large blower). Second, information about the load (e.g., inertia and torque) is typically required in order to step the motor.

The purpose of aligning the rotor as described earlier is to start the motor from a known rotor position. One way to avoid this aligning process is by knowing the rotor position by some other method. The second drawback described earlier can be overcome by not stepping blindly (without rotor position information) but by knowing the rotor position at almost zero speed.

In one embodiment, the invention provides a method of controlling an electrical machine having a stator and a rotor. The stator includes a core and a plurality of windings disposed on the core in a three-phase arrangement. The three-phase arrangement includes a first phase, a second phase, and a third phase having a first terminal, a second terminal, and a third terminal, respectively. The rotor is disposed adjacent to the stator to interact with the stator. The method includes the steps of applying a pulsed voltage differential to the first and second terminals resulting in movement of the rotor; monitoring the back electromotive force (BEMF) of the third phase to sense rotor movement; after the applying and monitoring steps, monitoring the BEMF of each of the first, second, and third phases to determine the direction of rotation of the rotor; determining whether the rotor is rotating in a desired direction, and electrically commutating the motor when the rotor is rotating in the desired direction and zero or more other conditions exist.

In another embodiment, the invention provides a method of controlling an electrical machine having a stator and a rotor. The stator includes a core and a plurality of windings disposed on the core in a multiphase arrangement. The rotor is disposed adjacent to the stator to interact with the stator. The method includes, prior to purposely causing movement of the rotor, sensing a BEMF of at least one of the phases, determining whether the rotor is moving based on the sensed BEMF, defining a state of the motor (e.g., a no moving state, a slow moving state, and a fast moving state), and stopping movement of the rotor if the motor falls under a slow moving state. The method can further include starting movement of the rotor as discussed above.

In yet another embodiment, the invention provides a method for controlling an electrical machine having a stator and a rotor. The stator includes a core having a plurality of phase windings disposed on a core. The rotor is disposed adjacent to the stator and includes a plurality of magnetic poles. The method includes initiating an aligning process of the stator and the rotor by generating a moving force to cause rotation of the rotor with respect to the stator and generating a braking force to at least slow rotation of the rotor with respect to the stator. The generating of a moving force to cause rotation of the rotor can include exciting at least one of the phase windings to generate an attracting magnetic force between the excited at least one phase winding and at least one of the magnetic poles, and the generating of a braking force to at least slow rotation of the rotor can include exciting at least one of the phase windings to generate a force opposite to the rotational direction of the rotor with respect to the stator. The method may also include alternating between generating the moving force and generating the braking force. The method may further include defining a specific amount of time to align the stator and the rotor, where the specific amount of time may include a plurality of cycles such as an exciting cycle, a braking cycle, and a coast cycle.

In a further embodiment, the invention provides a method for controlling an electrical machine with a stator and a rotor. The stator includes a core with a plurality of phase windings disposed on the core. The rotor is disposed adjacent to the stator and includes a plurality of magnetic poles. The method includes generating a moving force to cause rotation of the rotor with respect to the stator, and generating a braking force to at least slow rotation of the rotor with respect to the stator. The method also includes alternating the generating a moving force and the generating a braking force for a period of time, and stopping rotation of the rotor at one of one or more known rotor positions.

In another embodiment, the invention provides a method of controlling an electrical machine with a stator having a core and a plurality of windings disposed on the core in a multiple phase arrangement, and a rotor disposed adjacent to the stator to interact with the stator. The method includes applying a first pulsed voltage to a first terminal of a first phase of the multiphase arrangement, monitoring back electromotive force (BEMF) of at least one phase of the multiphase arrangement, and determining a peak value of BEMF. The method also includes obtaining a first monitored value of BEMF, comparing the peak value of BEMF against the first monitored value of BEMF, and determining whether the rotor is rotating based of the comparison.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected," "coupled," "supported," and "mounted" and variations thereof herein are used broadly and, unless otherwise stated, encompass both direct and indirect connections, couplings, supports, and mountings. In addition, the terms connected and coupled and variations thereof herein are not restricted to physical and mechanical connections or couplings.

Portions of an exemplary brushless direct current (BLDC) machine incorporating the invention are shown in FIGS. 1-4. However, the invention is not limited to the machine disclosed in FIGS. 1-4; other BLDC machines or electrically commutated machines (ECMs) can incorporate the invention.

Figure 1:
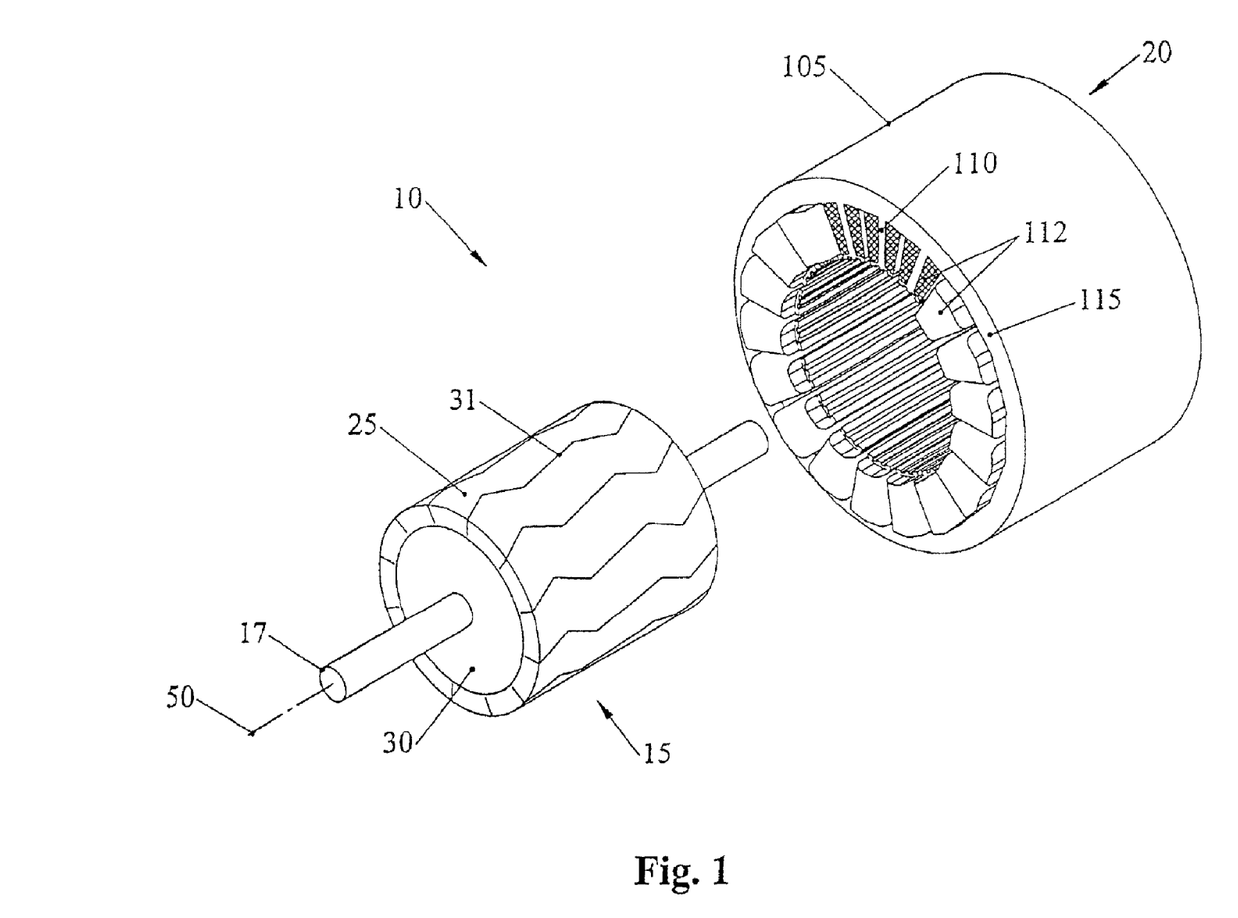
FIG. 1 is partial exploded view of the stator and rotor of a brushless permanent magnet electrical machine.

FIG. 1 is a partial exploded view of the stator and rotor of one construction of an electrical machine (e.g., motor, generator, etc.). For FIG. 1, the electrical machine is a motor having a rotor 15 and a stator 20. The rotor 15 is coupled to a shaft 17. In general, the stator 20 receives electrical power, and produces a magnetic field in response thereto. The magnetic field of the stator 20 interacts with a magnetic field of the rotor 15 to produce mechanical power on the shaft 17.

The rotor 15 includes a plurality of magnetic poles 25 of alternating polarity exhibited on a surface of a rotor core 30. The rotor core 30 includes laminations (e.g., magnetic steel laminations), and/or solid material (e.g., a solid magnetic steel core), and/or compressed powdered material (e.g., compressed powder of magnetic steel). One construction of the rotor 15 includes a sheet of permanent magnet (e.g., hard magnetic) material disposed on the rotor core 30. Another construction of the rotor 15 can include a plurality of strips of permanent magnet material attached (e.g., with adhesive) around the core 30. The permanent magnet material can be magnetized by a magnetizer to provide a plurality of alternating magnetic poles. Additionally, the number of magnetic strips can be different than the number of rotor magnetic poles. Yet another construction of the rotor 15 contains blocks of permanent magnet material placed inside the rotor core 30.

The description of the invention is not limited to a particular mechanical construction, geometry, or position of the rotor 15. For example, FIG. 1 shows the rotor 15 located inside and separated by a radial air gap from the stator 20. In another construction, the rotor 15 can be positioned radially exterior to the stator 20 (i.e., the machine is an external- or outer-rotor machine.)

Figure 2:
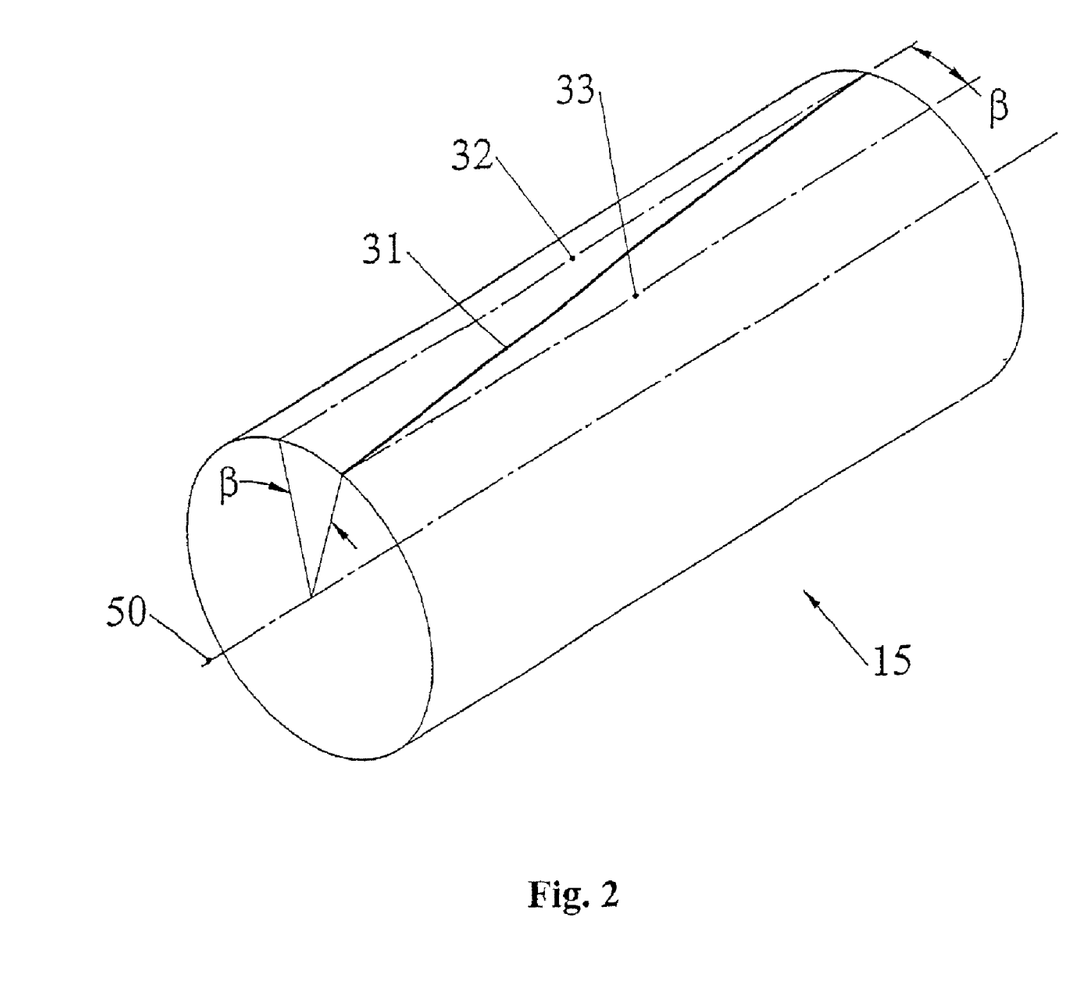
FIG. 2 is an isometric view showing the geometry used to define an arc of magnetization skew (β) on the rotor.

One method to reduce cogging and ripple torque, which may arise in some BLDC motors, is skewing the magnetization of the magnetic poles 25 with respect to the stator 20. Alternatively, stator teeth of the stator 20 can be skewed with respect to the rotor magnetization. As shown in FIGS. 1 and 2, the "magnetization" of the rotor 15 refers to the line pattern 31 along the length of the rotor 15 delineating alternating magnetic poles 25 on the rotor core 30.

FIG. 2 illustrates the geometrical concepts involved in defining the magnetization skew of the rotor. The arc of magnetization skew can be defined as the arc (β), measured in radians in between the longitudinal lines 32 and 33 on the rotor surface facing the air-gap, which separates the stator 20 and the rotor 15.

Figure 3:
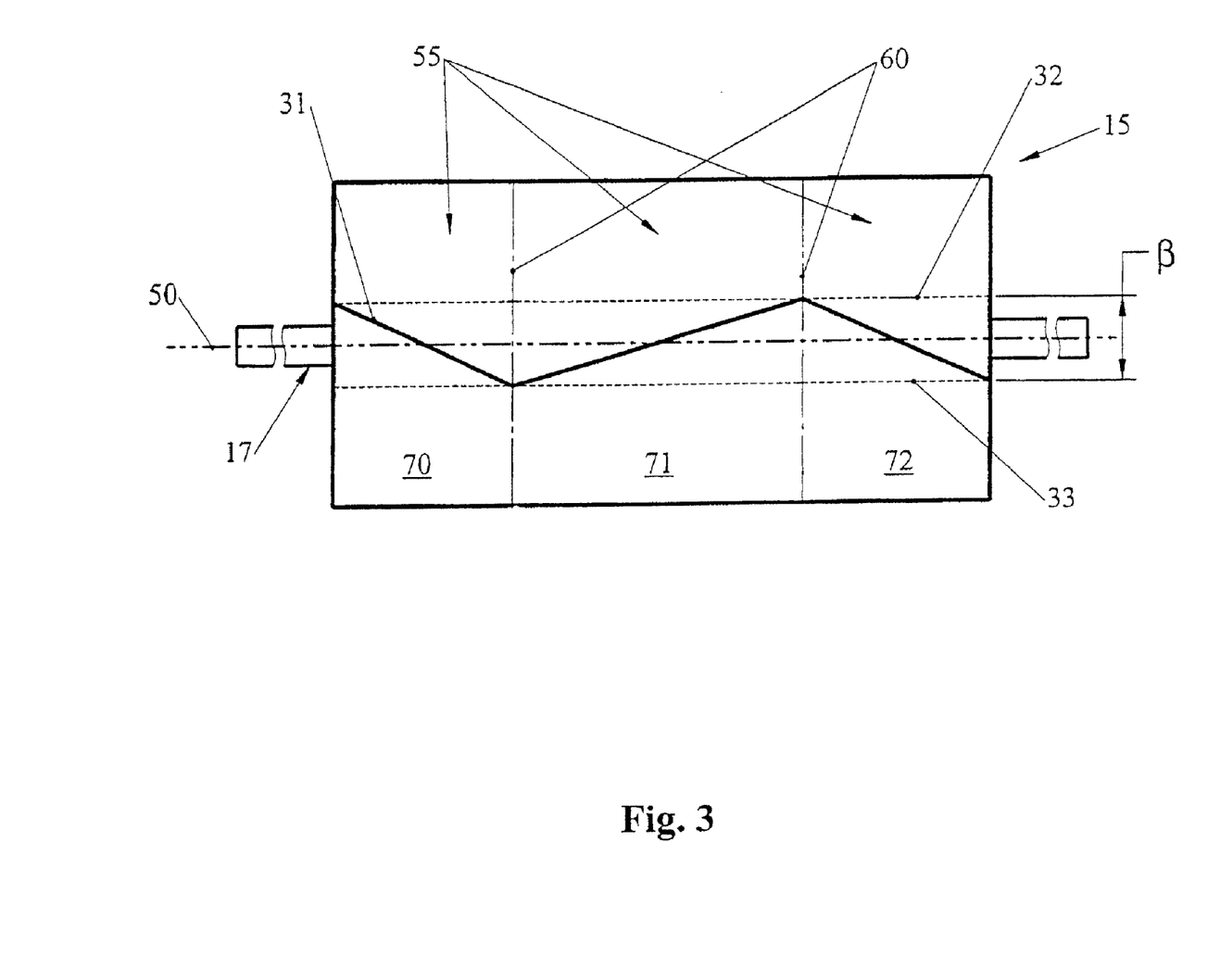
FIG. 3 is a longitudinal view of one construction of the rotor of FIG. 1.

FIG. 3 is a schematic representation of the rotor 15 divided into a plurality of axial sections 55 (e.g., 70, 71, and 72) along a rotational axis 50 of the rotor 15. The number of axial sections 55 can vary and is not limiting on the invention. An axial section 55 refers to a portion of the rotor 15 differentiated by imaginary lines 60. Imaginary lines 60 refer to locations on the rotor 15 where the direction of skew of the magnetization pattern 31 changes. One construction of the rotor 15 includes alternating magnetic poles with substantially the same arc of magnetization skew (β) along each axial section 55, resulting in a herringbone pattern of magnetization. The length of each axial section 55 can vary.

FIG. 3 shows one construction of the rotor 15 including three axial sections 70, 71, and 72. The stator 20 interacts with one or more of the three axial sections 70, 71, and 72. The first axial section 70 includes magnetic poles aligned with a first skew direction, the second axial section 71 includes magnetic poles aligned with a second skew direction, and the third axial section 72 includes magnetic poles aligned with the first skew direction. The total number of axial sections and the total number of ratings for a given motor profile are not limiting on the invention. Various designs of stator 20 can be used to interact with each construction of the rotor 15 described above and shown in FIGS. 1-3.

Figure 4:
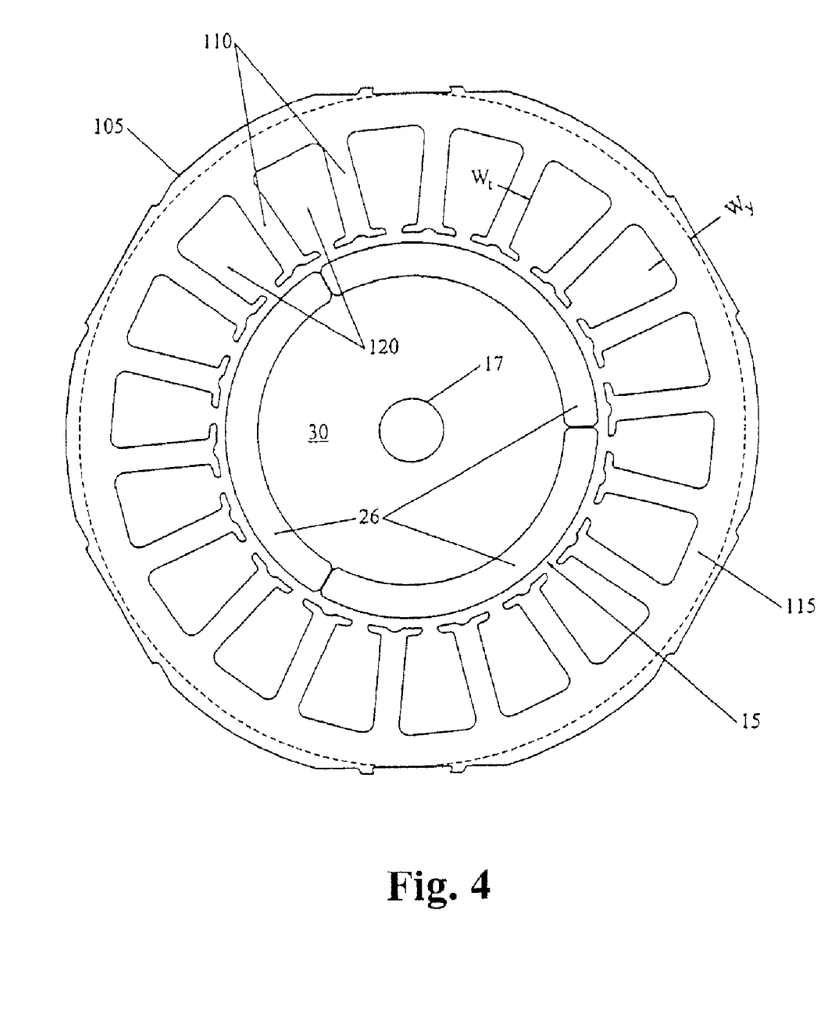
FIG. 4 is a cross-sectional view of the stator and rotor of FIG. 1.

With reference to FIGS. 1 and 4, the stator 20 includes a stator core 105 having a plurality of stator teeth 110, slots 120, and a back iron portion 115. A slot 120 is defined by the space between adjacent stator teeth 110 and receives stator windings 112. In one construction, the stator core 105 includes a stack of magnetic steel laminations or sheets. In other constructions, the stator core 105 is formed from a solid block of magnetic material, such as compacted powder of magnetic steel. The stator windings 112 can include electrical conductors placed in slots 120 and around the plurality of teeth 110. Other constructions and types of the stator core 105 and stator windings 112 known to those skilled in the art can be used and are not limiting on the invention.

Electrical current flowing through the stator windings 112 produces a magnetic field that interacts with the magnetization of the rotor 15 to provide torque to the rotor 15 and shaft 17. The electrical current can be an (m) phase alternating current (AC), where (m) is an integer greater than or equal to two. The electrical current can have various types of waveforms (e.g., square wave, quasi-sine wave, etc). The stator windings 112 receive electrical current from an electrical drive circuit.

The number (t) of stator teeth 110 equals the number of slots 120, where (t) is an integer. In the construction shown in FIG. 4, the rotor 15 is produced by fixing three arc shaped magnets 26 on the rotor core 30. Other rotor designs and constructions are also possible. A magnetizer is used to produce on the rotor 15 a number (p) of alternating magnetic poles that interact with the stator 20.

Figure 5:
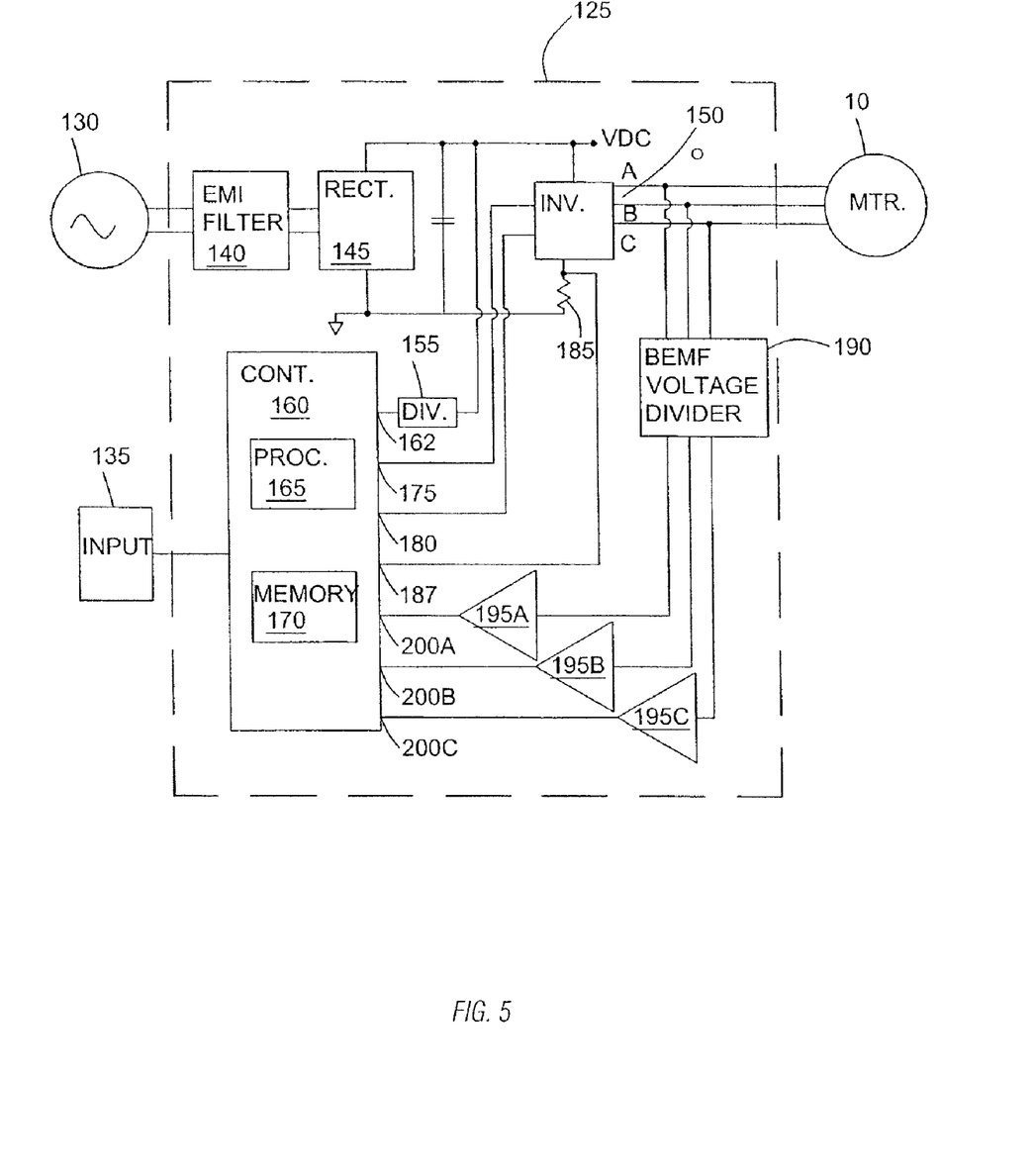
FIG. 5 is a block diagram of an electrical drive circuit for powering the electrical machine of FIG. 1.

FIG. 5 shows a drive circuit 125 that receives AC power from a power source 130 and drives the motor 10 in response to an input 135. The AC power is provided to a filter 140 and a rectifier 145 that filter and rectify the AC power, resulting in a bus voltage VDC. The bus voltage VDC is provided to an inverter 150 and to a voltage divider 155. The voltage divider 155 reduces the bus voltage VDC to a value capable of being acquired by a controller 160 (at a terminal 162). The controller 160 includes a processor 165 and a memory 170. Generally speaking, the processor 165 reads, interprets, and executes instructions stored in the memory 170 to control the drive circuit 125. The controller 160, which may be in the form of a microcontroller, can include other components such as a power supply, an analog-to-digital converter, filters, etc. The controller 160 issues drive signals at terminals 175 and 180 to control the inverter 150. The inverter 150 includes power electronic switches (e.g., MOSFETs, IGBTs) to vary the flow of current to the motor 10. For example, the inverter 150 can be in the form of a bridge circuit. A sense resistor 185 is used to generate a voltage having a relation to a bus current of the inverter 150. The voltage of the sensor resistor 185 is provided to the controller 160 at a terminal 187. Other methods of sensing current can be used to sense the bus current. The controller 160 can receive values associated with phase currents and phase voltages provided by the inverter 150. The drive circuit 125 also includes a BEMF voltage divider 190 and variable gain amplifiers 195A, 195B, and 195C. The BEMF voltage divider 190 and variable gain amplifiers 195A, 195B, and 195C provide voltage values to the controller 160 at terminals 200A, 200B, and 200C, respectively. The voltage values provided to the controller 160 by the variable gain amplifiers 195A, 195B, and 195C have a relation to the BEMF of each phase voltage.

Figures 6, 7:
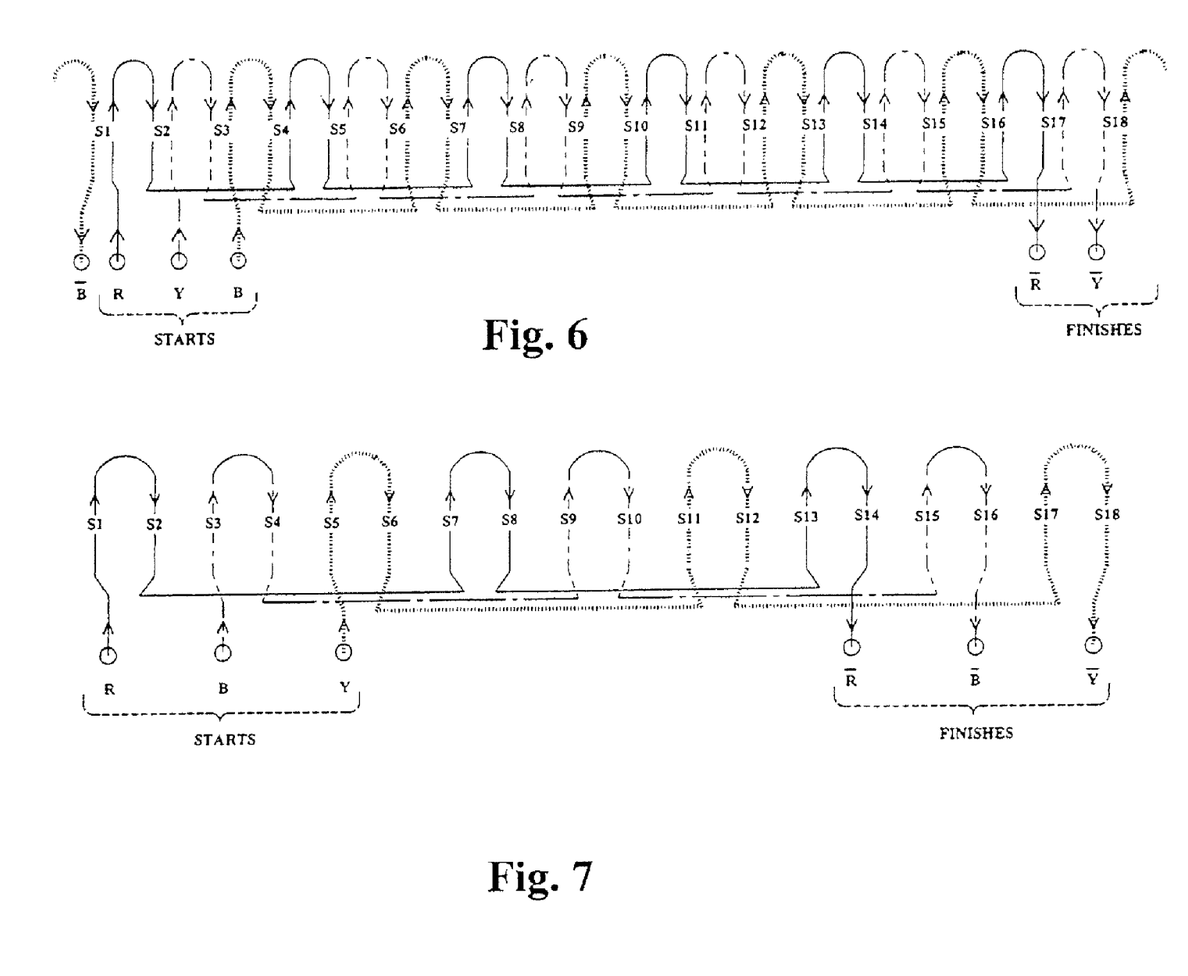
FIG. 6 is a stator-winding pattern in a double-layer arrangement with compact coils for an 18-slot, 12-pole, 3-phase machine.
FIG. 7 is a stator-winding pattern in a single-layer arrangement with compact coils for an 18-slot, 12-pole, 3-phase machine.

With reference to FIGS. 6 and 7, the stator core 105 having the above-described construction can be used to design and manufacture motors 10 with various (m) electric phases, windings 112 composed of compact coils, and rotors 15 having poles (p). One construction of the stator windings 112 includes a double layer arrangement of compact coils (FIG. 6), which are placed around each tooth 110 (i.e. the coils have a pitch of 1-slot). In this double layer arrangement, each slot 120 is shared by two coil sides, each of the coil sides belonging to a different coil and phase. The two coil sides sharing a slot 120 can be placed side by side or one on top of the other. FIG. 6 shows the double-layer winding pattern for an example 18-slot, 12-pole, 3-phase winding.

Another construction of the windings 112 includes a single layer arrangement of compact coils (FIG. 7), which are placed around every other tooth 110 (i.e. the coils have a pitch of 1-slot and are only placed around half the number of teeth 110). In this single layer arrangement, each slot 120 contains only one coil side. FIG. 7 shows the single layer winding pattern for an example 18-slot, 12-pole, 3-phase winding. A typical manufacturing technique to provide a double layer stator winding with compact coils includes use of a needle or gun winder. A typical manufacturing technique to provide a single layer stator winding with compact coils includes use of an insertion winder. Other types and techniques known to those in the art to provide the stator windings 112 of the stator 20 can be used.

With reference to FIG. 5, the drive circuit 125 can estimate the rotor 15 position through sensorless control. Sensorless motor commutation is often performed by sensing the back electromotive force (BEMF) produced by the motor 10. Typically, the BEMF signal produced in the stator windings 112 is not large enough for sensorless motor commutation until the speed of the rotor 15 reaches about ten percent of the rated motor 10 speed. Described below are various starting procedures for starting a BLDC motor 10 utilizing sensorless control.

The starting procedure is described below in three sections. The first section is a rotor position detection section. The second section is an initial pulsing section. The last section is a low-speed BEMF detection section. The starting procedure is stored as software instructions in the memory 170. The processor 165 reads the instructions from the memory 170, interprets the instructions, and executes the interpreted instruction resulting in the operation of the motor 10 as described below. Other circuit components (e.g., an ASIC) can be used in place of the processor 165 and the memory 170 to control the motor 10.

A. Initial Rotor Position Detection

The initial position detection of the rotor 15 is based on a more simplified version of an algorithm disclosed in U.S. Pat. No. 5,001,405 (the '405 patent), which is fully incorporated herein by reference. The '405 patent describes a method of exciting one phase of a three phase motor with one polarity, and then, exciting the same phase with the opposite polarity. Through a comparison of the peak current, the rotor position is known within 60 degrees.

Some of the starting algorithms described in this application do not excite the winding with the opposite current. This reduces the initial position resolution to 120 degrees (for a three-phase motor). Using this more simplified method of determining the position of the rotor 15 with a resolution of 120 degrees provides enough information to get the motor 10 started in the correct direction.

Figure 8:
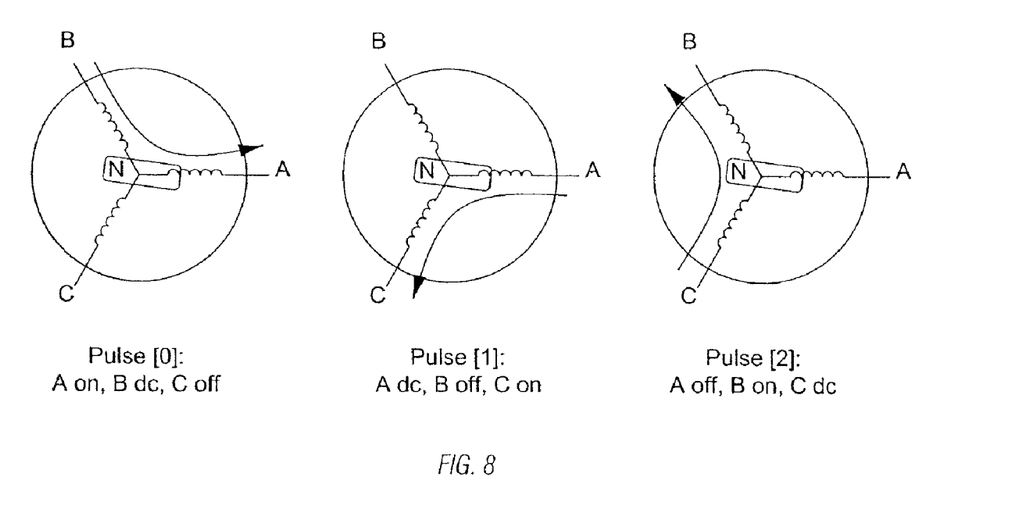
FIG. 8 shows schematic diagrams representing three pulses being applied to a three-phase motor.

With reference to FIG. 8, the controller 160 uses the following pulse sequence:
Pulse [0]=Aon, Bdc, Coff (current goes in phase B and returns in phase A);
Pulse [1]=Adc, Boff, Con (current goes in phase A and returns in phase C); and
Pulse [2]=Aoff, Bon, Cdc (current goes in phase C and returns in phase B);
where dc represents a pulsed bus voltage, on represents the phase being grounded, and off represents no current in the winding. The current is measured at the end of each pulse. The sequence with the greatest current determines the rotor position and which phase to apply the first pulse movement.

In an alternate construction, the controller 160 uses the following pulse sequence:

PulseParallel [0]=Aon, Bdc, Cdc (current goes in phase B and returns in phases A and C);
PulseParallel [1]=Adc, Bdc, Con (current goes in phase A and returns in phase C and B); and
PulseParallel [2]=Adc, Bon, Cdc (current goes in phase C and returns in phase B and A);
where dc represents a pulsed bus voltage and on represents the phase being grounded. The current is measured at the end of each pulse. The sequence with the greatest current determines the rotor position and which phase to apply the first pulse movement.

The winding sequence with the highest current is the winding that has the magnet most aligned with the field created by the winding. It is assumed that the direction of the current is also the direction of the north pole created by the winding current. For the example shown in FIG. 8, phase B has the magnet most aligned (see arrangement shown as "Pulse[2]" in FIG. 8). Therefore, the next sequence to turn on is Aon, Bdc, Coff or an intermediate sequence of Aon, B of, Cdc. Preferably, the durations of the initial rotor pulses are fast enough and the current level is small enough to not cause the rotor 15 to move.

B. Initial Pulsing

An initial pulse, long enough to cause movement in the rotor 15, is applied to the appropriate phase from the information gathered from the previous section. The duty cycle or voltage applied to the winding 112 is set during the initial pulse such that the voltage for the phase that is open can be amplified to a level that movement is detected by monitoring a change in the voltage. If the initial pulsed voltage is too large, then the motor accelerates too fast causing a torque transient that results in an undesirable audible noise at start. If the initial pulsed voltage is too small then there might not be enough torque to cause movement in the rotor 15. The initial movement of the rotor 15 depends on where the rotor 15 is positioned within the 120 degree window. Sampling BEMF at the start of the pulse gets a baseline voltage before movement has occurred. The BEMF is then monitored for a change in voltage, which is related to rotor movement. During the initial pulse sequence, the rotor 15 can actually move backwards before it moves forward. If this occurs, the controller 160 applies a braking pulse to stop or slow the rotor movement, and the controller 160 returns to the previous section.

C. Coast; Sense BEMF Crossings (Low Speed BEMF Detection Method)

Figure 9:
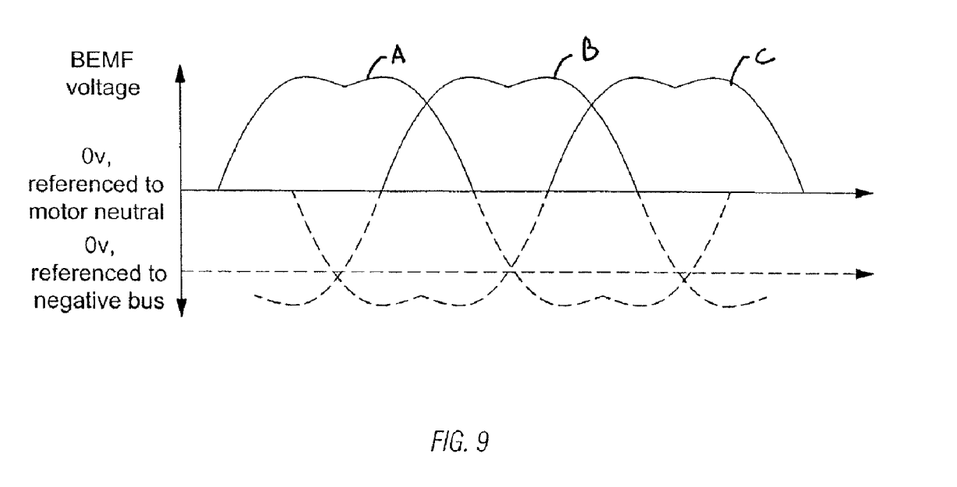
FIG. 9 represents a comparison of BEMFs for a three phase machine.

Once movement is detected and all phases are turned off, the BEMF is monitored for phase crossings. The negative half of the BEMF is clamped by diodes in the inverter 150. A commutation point occurs when the BEMF phases intersect, as shown in FIG. 9.

More specifically, the software monitors three parameters:
1) Aphase>Bphase
2) Bphase>Cphase
3) Cphase>Aphase
These parameters are used to decode the rotor commutation position as follows:

| Aphase > Bphase | Bphase > Cphase | Cphase > Aphase | |
| --- | --- | --- | --- |
| TRUE | FALSE | FALSE | Commutation[0] |
| TRUE | TRUE | FALSE | Commutation[1] |
| FALSE | TRUE | FALSE | Commutation[2] |
| FALSE | TRUE | TRUE | Commutation[3] |
| FALSE | FALSE | TRUE | Commutation[4] |
| TRUE | FALSE | TRUE | Commutation[5] |

At the first change in any of the three conditions, the software in memory 170 starts a timer, and then, subsequently looks for the next "proper" transition. This is to make sure the motor 10 is running in the proper direction. Upon the second change in BEMF condition, the software stops the timer and measures the period. The controller 160 then commutates the motor with the appropriate commutation phase sequence (assuming the rotor 15 is rotating in the proper direction). The software keeps the phase on as specified by the previous period, while looking for a conventional BEMF zero-cross event. The motor 10 can then commutate as is conventionally known in the art. For example, the controller 160 can use a six-step control technique for driving the motor 10. An example six step phase sequence to commutate the motor is
Commutation [0]=Adc, Bon, Coff (current goes in phase A and returns in phase B);
Commutation [1]=Adc, Boff, Con (current goes in phase A and returns in phase C);
Commutation [2]=Aoff, Bdc, Con (current goes in phase B and returns in phase C);
Commutation [3]=Aon, Bdc, Coff (current goes in phase B and returns in phase A);
Commutation [4]=Aon, Boff, Cdc (current goes in phase C and returns in phase A);
Commutation [5]=Aoff, Bon, Cdc (current goes in phase C and returns in phase B);
where dc represents a pulsed bus voltage and on represents the phase being grounded.

Figure 10:
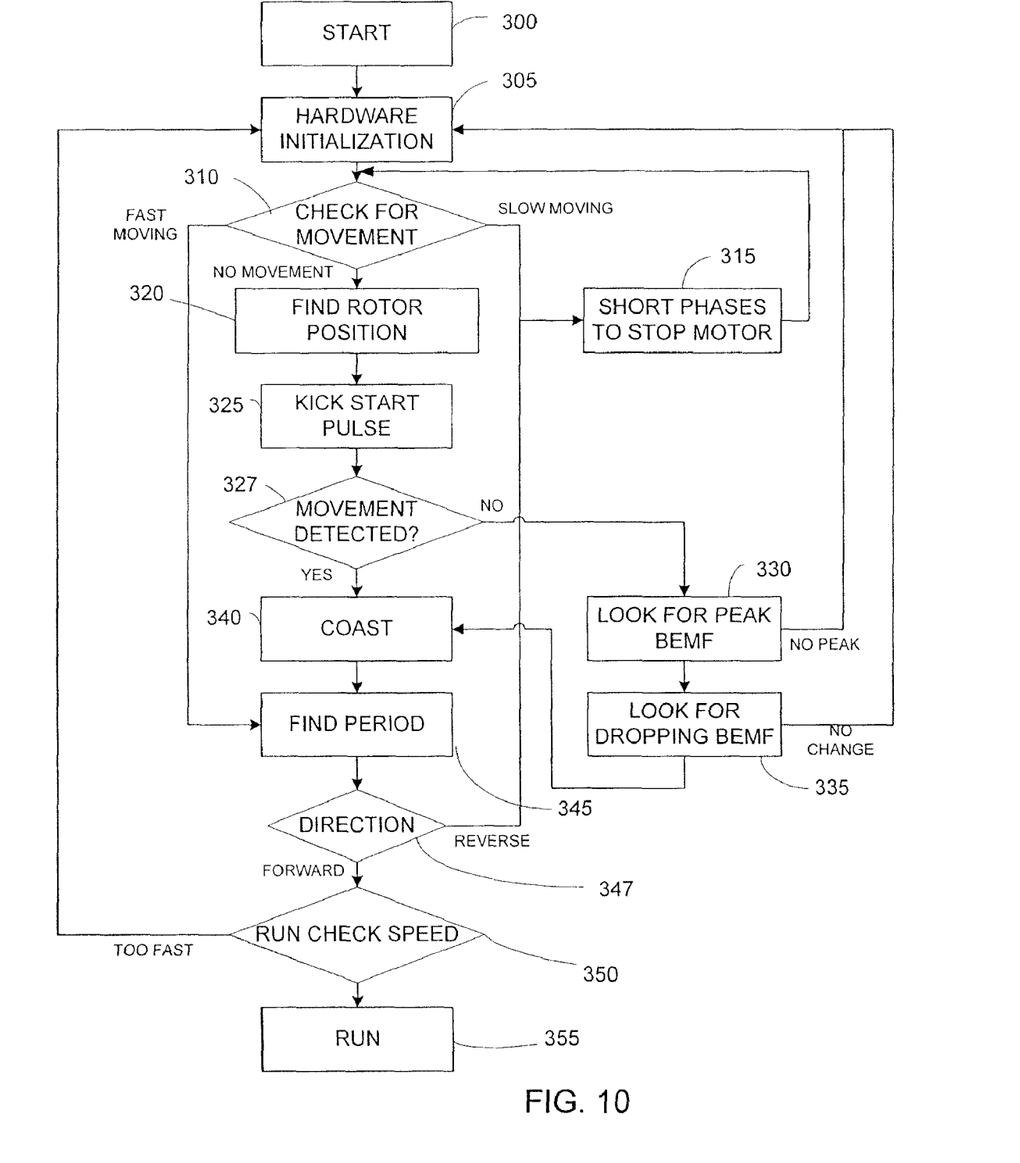
FIG. 10 shows one start routine of a BLDC motor.

FIG. 10 illustrates a flow chart describing one possible method for detecting the position of the rotor 15 and starting rotational movement of the rotor 15 utilizing the electrical drive circuit 125. The process illustrated by the flow chart can be started automatically or manually (at block 300). A hardware initialization procedure takes place at block 305. The hardware initialization procedure can include charging energy storing devises (e.g., capacitors) to help control the flow of current to the stator windings.

Occasionally, the rotor 15 is in motion when the method for starting the motor 10 is initiated. The controller 160 measures the BEMF to detect movement of the rotor 15 (at block 310). The variable gain amplifiers 195 are switched to a high gain mode to detect possible low BEMF signals produced by the motor 10. Low BEMF signals are generally indicative of significantly slow motion of the rotor 15. The controller 160 usually determines the rotational speed of the rotor 15 by measuring the time between BEMF crossings, such as the ones illustrated in FIG. 9. For example, if the time between BEMF crossings increases, it is determined that the rotor 15 is slowing down. The speed of the rotor 15 may be classified as one of various states. For example, states determined by the speed of the rotor 15 can include a no moving state, a slow moving state, or a fast moving state. If the speed of the rotor 15 falls under the slow moving state, the rotor 15 is stopped by shorting phases A, B, and/or C (at block 315).

The controller 160 classifies the speed of the rotor 15 under the no moving state when there is relatively no rotation of the rotor 15. In such case, the controller 160 determines the position of the rotor 15 with respect to the stator 20 (at block 320) as previously discussed. Based on the determined position, the controller 160 applies a relatively longer duration pulse (at block 325) in comparison to the pulsed bus voltage used to determine the position of the rotor 15 at block 320. The longer duration pulse intends to cause rotational movement of the rotor 15 in a desired direction (for purposes of description, the desired rotational direction is identified as the "forward" direction).

Because the pulsed bus voltage does not provide information to the controller 160 regarding the load to be manipulated by the motor 10, it is possible that the longer duration pulse does not cause significant movement of the rotor 15. The controller 160 determines that there is no movement of the rotor 15 when it does not detect zero-cross events (at block 327). The controller 160 then implements alternative methods for detecting variations of BEMF signals indicative of rotor 15 movement. For example, the controller 160 searches for peaks of BEMF signals (at block 330). When no peaks are detected, it is determined that the longer duration pulse had insufficient strength to cause rotation of the rotor 15, and the controller 160 returns to the hardware initialization procedure (at block 305). If the controller 160 detects a BEMF peak, the controller searches for a dropping BEMF (at block 335). The controller 160 returns to the hardware initialization procedure (at block 305) when there is no significant change in the BEMF signals.

The controller 160 proceeds to a coast state (at block 340) when the controller 160 detects a dropping BEMF (at block 335), or when it is determined (at block 327) that the applied longer duration pulse produces rotation of the rotor 15. The controller 160 turns off the inverter 150 and monitors the BEMF as the rotor 15 is allowed to coast (at block 340). Monitoring the BEMF allows the controller 160 to determine a period in relation to the rotational speed of the rotor 15 (at block 345), and the rotational direction of the rotor 15 (at block 347).

With reference to block 310, the controller 160 proceeds directly to determine the period (at block 345) when the rotational speed of the rotor 15 is classified under a fast moving state (at block 310). Because the controller 160 detects the position of the rotor 15 with accuracy up to 120 degrees (at block 320), it is possible for the rotor 15 to rotate in the direction opposite to the one desired (also referred as the "reverse" direction) after initiating motion (at block 325). In some cases when the controller 160 determines that the rotational speed of the rotor 15 is classified under the fast moving state (at block 310), the rotor 15 may also be rotating in the reverse direction. In the cases when the controller 160 determines that the rotor 15 is moving in the reverse direction (at block 347), the controller 160 shorts the phases A, B, and/or C to stop rotational movement of the rotor 15 (at block 315).

The controller 160 allows the rotor 15 to rotate in a forward direction after turning on the inverter 150, and monitors the BEMF for a predetermined amount of time (at block 350). The controller 160 determines if the rotational speed of the rotor 15 is above a threshold value after the predetermined amount of time. It is assumed that noise and crosstalk, usually generated by the motor 10 or other electric components, are mistaken for BEMF signals if the speed of the rotor 15 is above the threshold value. The threshold value in relation to rotational speed of the rotor 15 may vary based on factors such as the size of the motor 10 or the load coupled to the motor 10. When the speed of the rotor 15 is above the threshold value, the controller 160 returns to the hardware initialization procedure (at block 305). Alternatively, when the speed of the rotor 15 is below the threshold value, the controller proceeds to a run mode (at block 355).

Figure 11:
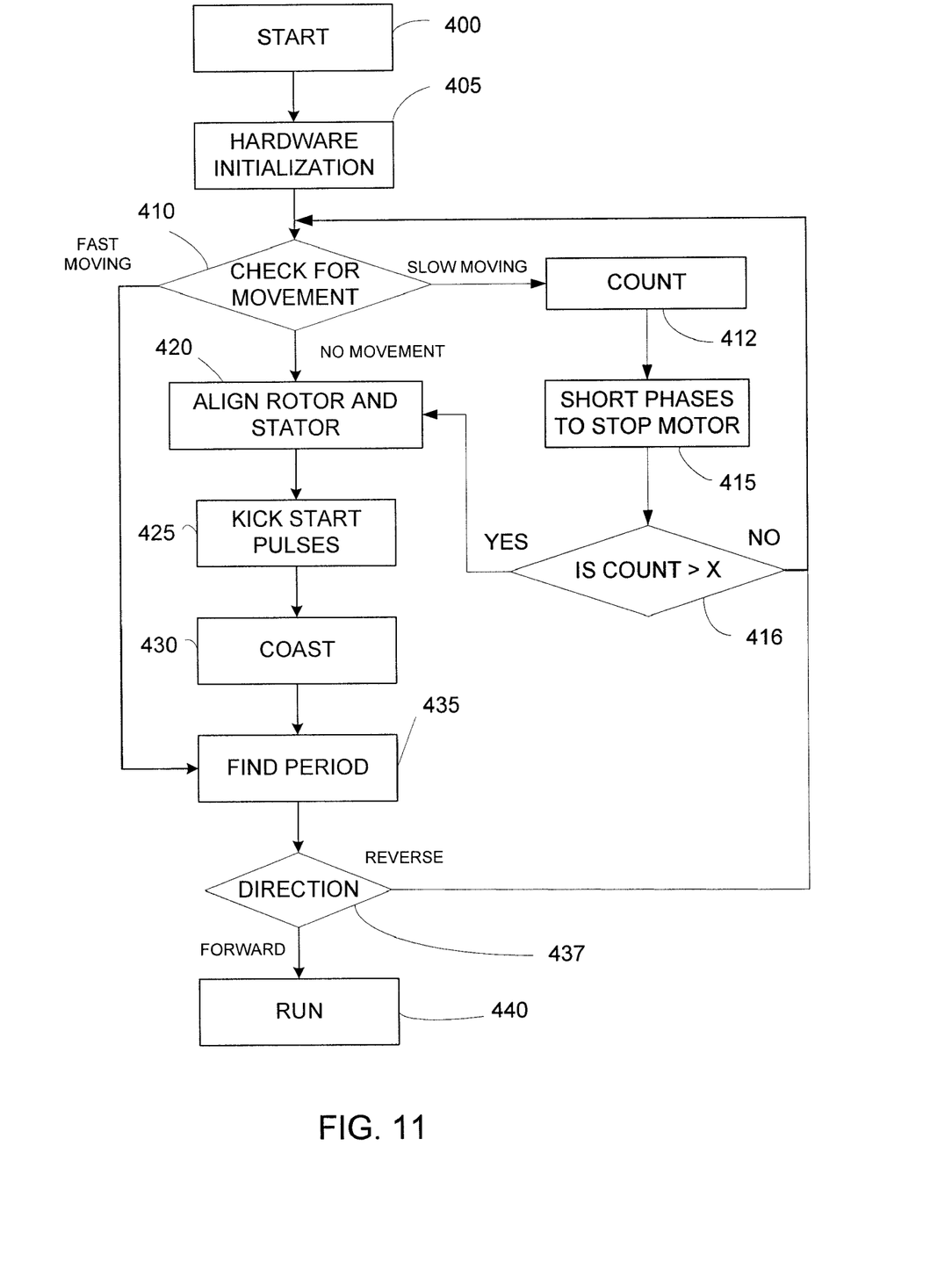
FIG. 11 shows another start routine of a BLDC motor.

FIG. 11 illustrates a flow chart describing another method for starting rotational movement of the rotor 15 utilizing the electrical drive circuit 125. More particularly, the method includes aligning the rotor 15 with the stator 20 to position the rotor 15 at one of one or more known starting positions. The process illustrated by the flow chart can be started automatically or manually (at block 400). A hardware initialization procedure takes place at block 405. The hardware initialization procedure can include charging energy storing devises (e.g., capacitors) to help control the flow of current to the stator windings.

Occasionally, the rotor 15 is in motion when the method for starting the motor 10 is initiated. The controller 160 measures the BEMF to detect movement of the rotor 15 (at block 410). The variable gain amplifiers 195 are switched to a high gain mode to detect possible low BEMF signals produced by the motor 10. Low BEMF signals are generally indicative of very slow motion of the rotor 15. The controller 160 usually determines the rotational speed of the rotor 15 by measuring the time between BEMF crossings, such as the ones illustrated in FIG. 9. The speed determined from the BEMF signals may be classified under various states. For example, some states may include a no moving state, a slow moving state, or a fast moving state.

If the speed of the rotor 15 falls under the slow moving state, the rotor 15 is stopped by shorting phases A, B, and/or C (at block 415). In some embodiments, the slow moving state is indicative of a speed below 7-10% (e.g., 8%) of the full rotational speed of the rotor 15. In such cases, the fast moving state is indicative of speeds equal or above 7-10% (e.g., 8%) of the full rotational speed of the rotor 15. The controller 160 accounts for the transition between determining the speed of the rotor 15 under the slow moving state (at block 410) and stopping the rotor 15 (at block 415) by taking a numeric count (at block 412). After stopping the rotor 15 (at block 415), the controller 160 compares the numeric count to a predetermined value X (at block 416). The predetermined value X is indicative to the maximum number of times the rotor 15 is stopped (at block 415) in a continuous matter after the controller 160 determines the speed of the rotor 15 falls under the slow moving state. This control sequence defined by blocks 412 and 416 is generally applicable in cases when outside influences cause the rotor 15 to rotate after shorting the phases A, B, and/or C (at block 415). As indicated in block 416, once the numeric count becomes larger than the predetermined value X, the controller 160 resets the numeric count and proceeds to align the rotor 15 with the stator 20 as subsequently explained.

The controller 160 classifies the speed of the rotor 15 under the no moving state when there is relatively no rotation of the rotor 15 with respect to the stator 20. In such cases, the control 160 initiates a procedure to align the rotor 15 with the stator 20 to position the rotor 15 at one of one or more known starting positions (at block 420). The alignment procedure includes applying a pulse to one or more of the phase windings A, B, and C to generate an electromotive force (EMF). The generated EMF causes a section of the rotor 15 to attract to the section of the stator 20 being excited, thereby causing the rotor 15 rotate. As a result, the position of the rotor 15 at the end of the aligning procedure (at block 420) is set to one of one or more known positions.

In some constructions, the rotor 15 is connected to a relatively larger mass resulting in oscillation of the rotor 15 for an extended period of time until the rotor 15 and stator 20 are aligned. The procedure represented by block 420 may also include shorting one or more phase windings A, B, and/or C to generate an opposing braking force. The braking force is described as "opposing" because it opposes rotation of the rotor 15 regardless of the rotational direction. Because the braking force is proportional to the BEMF generated by rotation of the rotor 15, the braking force is generally proportional to the rotational speed of the rotor 15. Thus, shorting the phase windings as the rotor 15 rotates at a relatively higher speed will generate a greater braking force, as opposed to the force generated when the rotor 15 is rotating at a relatively lower speed. It is possible to damp the rotor 15 oscillations by alternating powering one phase winding (to rotate the rotor 15) and shorting the phase windings A, B, and C (to stop the rotor 15). Alternating powering and shorting phases helps reduce the rotor 15 oscillating time over an aligning cycle.

Before proceeding further, it should be understood that when referring to generating a breaking force, the controller 160 controls the power or current to or in the windings to result in a force opposing the rotation of the rotor 15. For example, the generating a braking force can be accomplished by shorting two or more phases of the windings together. As another example, the controller 160 can supply and switch current into the windings in such a way as to oppose motion of the rotor 15. Other variations are possible.

In some constructions, the controller 160 establishes specific periods of time for alternating the powering of one or more phase windings and the shorting of one or more phase windings to align the rotor 15 and stator 20. For example, the time assigned to the excitation of one phase winding may be about 350 µs and the time assigned to the braking of the rotor 15 (by shorting at least one of the phase windings) may vary between 150 µs to 2.86 ms.

In one construction, the braking time progressively increases from 150 µs to 2.86 ms through an aligning cycle of 900 ms. The braking time is intended to increase through the aligning cycle to allow for relatively little braking force at the beginning of the aligning cycle and large braking force at the end of the aligning cycle. Varying the braking time can also prevent the motor 10 from generating resonant noise, otherwise created by implementing a constant excitation time and a constant braking time.

One variation to the procedure represented by block 420 can be accomplished by changing the number of phase windings shorted during each braking cycle. For example, the controller 160 can generate the opposing braking force by shorting two phase windings. It is also within the scope of the invention to short different phase windings in each braking cycle through the aligning cycle. Another variation includes adjusting the excitation and braking times. Yet another variation includes introducing a coast cycle to the aligning cycle. The coast cycle allows the rotor 15 to rotate without excitation or shorting of the phase windings. In some occasions, introducing the coast cycle is found to allow the rotor 15 to rotate back to the position where it started before any excitation when the rotor 15 starts 180° from aligned.

After the rotor 15 is aligned with the stator 20, the controller 160 applies a set of relatively longer duration pulses to two phases and monitors the BEMF of the third phase (at block 425). The longer duration pulses intend to cause rotational movement of the rotor 15 in the forward direction. In comparison to the start routine illustrated in FIG. 10, the pulses applied at block 425 are generally longer than the pulse applied at block 325. The starting algorithm in FIG. 10 illustrates finding the position of the rotor 15 with accuracy of 120°, thus applying the longer duration pulse (at block 325) may cause the rotor 15 to rotate in the reverse direction. In comparison, the starting algorithm in FIG. 11 illustrates aligning the rotor 15 with the stator 20 to one of one or more known positions, thus there is higher certainty of the location of the rotor 15 with respect to the stator 20 allowing for the application of stronger pulses.

In one construction, block 425 illustrates applying a defined number of pulses (e.g., 6 pulses) sequentially to two phase windings while concurrently monitoring the BEMF from the third phase winding as illustrated in FIG. 8. The BEMF generated by the third phase winding is indicative of the relative velocity and location of the rotor 15 with respect to the phase windings A, B, and/or C of stator 20. Each pulse is applied or active (at block 425), while the BEMF generated by the third phase winding is above a predetermined amount of decrease. That is, the actual value of BEMF is not necessarily required. Rather, the controller can monitor the BEMF for an amount of decrease (or delta BEMF) from a previously sensed BEMF (e.g., a sensed BEMF when first applying a pulse). Once the delta BEMF has been met, the pulse is no longer generated, a subsequent pulse is applied, and the process of monitoring for a delta BEMF is repeated. Applying pulses sequentially allows for the rotor 15 to gain speed in comparison to applying the longer duration pulse (at block 325). Additionally, as the rotor 15 gains speed, the pulses become shorter in response to the BEMF raising and dropping at a faster rate. Alternative constructions can include applying pulses (at block 425) in sequences which skip one phase winding when applying the subsequence pulse. Other constructions may also include varying the number of pulses applied to the rotor 15 based on the current speed of the rotor 15.

After the controller 160 applies the longer duration pulses (at block 425), the controller 160 proceeds to a coast state (at block 430), turning off the inverter 150 and monitoring the BEMF. Monitoring the BEMF allows the controller 160 to determine a period in relation to the rotational speed of the rotor 15 (at block 435), and the rotational direction of the rotor 15 (at block 437).

With reference to block 410, the controller 160 proceeds directly to determine the period (at block 435) when the speed of rotor 15 is classified under the fast moving state (at block 410). It is possible for the rotor 15 to rotate in the reverse direction after initiating motion (at block 425). It is also possible that the longer duration pulse causes no significant movement of the rotor 15, thus disabling the controller 160 from calculating a period at block 435. In the case the controller 160 determines that the rotor 15 is not moving or the rotor 15 is moving in the reverse direction (at block 437), the controller 160 shorts the phases A, B, and/or C to stop rotational movement of the rotor 15 (at block 415). Alternatively, if the controller 160 determines that the rotor 15 is moving in the forward direction, the controller 160 proceeds to a run mode (at block 440).

Various features and advantages of the invention are set forth in the following claims.

What is claimed is:

1. A method of controlling an electrical machine including a stator having a core and a plurality of windings disposed on the core in a multiple phase arrangement, and a rotor disposed adjacent to the stator to interact with the stator, the method comprising:

applying a first pulsed voltage to a first terminal of a first phase of the multiphase arrangement;

monitoring back electromotive force (BEMF) of at least one phase of the multiphase arrangement;

obtaining a first monitored value of BEMF;

obtaining a second monitored value of BEMF at an interval after the obtaining the first monitored value;

comparing the second monitored value with the first monitored value;
determining whether the rotor is rotating based of the comparison; and
preventing movement of the rotor in response to the second monitored value being substantially similar to or greater than the first monitored value.

2. The method of claim 1, further comprising
determining a period indicative of rotational movement of the rotor in response to the first monitored value being less than the second monitored value by at least an amount; and
determining a rotational direction of the rotor.

3. The method of claim 2, further comprising
determining a rotational speed of the rotor in response to the rotational direction of the rotor being in a desired rotational direction; and
electrically commutating the motor in response to the rotational speed of the rotor being lesser than a predetermined parameter.

4. The method of claim 2, further comprising
preventing movement of the rotor in response to determining the rotational direction of the rotor being different than a desired rotational direction.

5. A method of controlling an electrical machine comprising
a stator comprising a core and a plurality of windings disposed on the core in a three-phase arrangement, the three-phase arrangement comprising a first phase, a second phase, and a third phase having a first terminal, a second terminal, and a third terminal, respectively, and
a rotor disposed adjacent to the stator to interact with the stator, the method comprising:
applying a pulsed voltage differential from the first terminal to the second terminal resulting in movement of the rotor;
after the applying step,
monitoring the back electromotive force (BEMF) of each of the first, second, and third phases to determine the direction of rotation of the rotor,
determining whether the rotor is rotating in a desired direction, and
electrically commutating the motor based on the rotor is rotating in the desired direction,
wherein monitoring the BEMF of each of the first, second, and third phases comprises monitoring for changes in at least one of the following conditions
whether the BEMF of the first phase is greater than the BEMF of the second phase, and
whether the BEMF of the second phase is greater than the BEMF of the third phase, and
whether the BEMF of the third phase is greater than the BEMF of the first phase; and
determining the direction of rotation of the rotor based on the monitoring for changes step.

6. The method of claim 5, further comprising, between the applying and monitoring steps, monitoring the BEMF of the third phase to sense rotor movement.

7. The method of claim 5, wherein the pulsed voltage differential is a fourth pulsed voltage differential; and
wherein the method further comprises
applying a first pulsed voltage differential from the second terminal to the first terminal, the first pulsed voltage differential resulting in substantially no movement of the rotor,
acquiring a first value having a relation to a current resulting from the first pulsed voltage differential,
applying a second pulsed voltage differential from the first terminal to the third terminal, the second pulsed voltage differential resulting in substantially no movement of the rotor,
acquiring a second value having a relation to a current resulting from the second pulsed voltage differential,
applying a third pulsed voltage differential from the third terminal to the second terminal, the third pulsed voltage differential resulting in substantially no movement of the rotor, and
acquiring a third value having a relation to a current resulting from the third pulsed voltage differential.

8. The method of claim 7, wherein the method further comprises determining which of the first, second, and third values has the largest magnitude, and
wherein applying the fourth pulsed voltage and monitoring the BEMF is based on the third value being the largest magnitude.

9. The method of claim 7, wherein the first value has a relation to a bus current resulting from the first pulsed voltage differential.

10. The method of claim 7, wherein the first value has a relation to a phase current resulting from the first pulsed differential.

11. The method of claim 5, wherein the applying and monitoring steps occur at least partially simultaneously.

12. The method of claim 5, further comprising:
after the applying and monitoring steps, monitoring the BEMF of each of the first, second, and third phases to determine the speed of rotation of the rotor.

13. The method of claim 5, wherein the pulsed voltage differential is a fourth pulsed voltage differential; and
wherein the method further comprises
applying a first pulsed voltage differential to the terminals resulting in a current from the second terminal to the first and third terminals, the first pulsed voltage differential resulting in substantially no movement of the rotor,
acquiring a first value having a relation to a current resulting from the first pulsed voltage differential,
applying a second pulsed voltage differential to the terminals resulting in a current from the first terminal to the second and third terminals, the second pulsed voltage differential resulting in substantially no movement of the rotor,
acquiring a second value having a relation to a current resulting from the second pulsed voltage differential,
applying a third pulsed voltage differential to the terminals resulting in a current from the third terminal to the first and second terminals, the third pulsed voltage differential resulting in substantially no movement of the rotor,
acquiring a third value having a relation to a current resulting from the third pulsed voltage differential.

14. The method of claim 13, wherein the method further comprises determining which of the first, second, and third values has the largest magnitude; and
wherein applying the fourth pulsed voltage and monitoring the BEMF occur when the third value has the largest magnitude and zero or more other conditions exist.

15. A method of controlling an electrical machine including a stator having a core and a plurality of windings disposed on the core in a multiple phase arrangement, and a rotor disposed adjacent to the stator to interact with the stator, the method comprising:

applying a first pulsed voltage to a first terminal of a first phase of the multiphase arrangement;

monitoring back electromotive force (BEMF) of at least one phase of the multiphase arrangement;

obtaining a first monitored value of BEMF;

obtaining a second monitored value of BEMF at an interval after the obtaining the first monitored value;

comparing the second monitored value with the first monitored value;

determining whether the rotor is rotating based of the comparison;

determining a period indicative of rotational movement of the rotor in response to the first monitored value being less than the second monitored value by at least an amount;

determining a rotational direction of the rotor; and preventing movement of the rotor in response to determining the rotational direction of the rotor being different than a desired rotational direction.

16. The method of claim 15, further comprising determining a rotational speed of the rotor in response to the rotational direction of the rotor being in a desired rotational direction; and electrically commutating the motor in response to the rotational speed of the rotor being lesser than a predetermined parameter.

17. The method of claim 15, further comprising preventing movement of the rotor in response to the second monitored value being substantially similar to or greater than the first monitored value.

18. The method of claim 15, wherein the applying and monitoring steps occur at least partially simultaneously.

* * * * *